(12) United States Patent
Pehlke

(10) Patent No.: US 11,863,217 B2
(45) Date of Patent: *Jan. 2, 2024

(54) MODULE ARRANGED TO BIDIRECTIONALLY PASS COUPLED POWER SIGNAL

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/449,353

(22) Filed: Sep. 29, 2021

(65) Prior Publication Data

US 2022/0103193 A1 Mar. 31, 2022

Related U.S. Application Data

(60) Provisional application No. 63/085,835, filed on Sep. 30, 2020.

(51) Int. Cl.
*H04M 1/00* (2006.01)
*H04B 1/04* (2006.01)
*H04B 1/16* (2006.01)
*H04B 17/10* (2015.01)
*H04B 1/00* (2006.01)

(52) U.S. Cl.
CPC .......... *H04B 1/0458* (2013.01); *H04B 1/006* (2013.01); *H04B 1/04* (2013.01); *H04B 1/0483* (2013.01); *H04B 1/1615* (2013.01); *H04B 17/102* (2015.01); *H04B 17/103* (2015.01); *H04B 2001/0408* (2013.01); *H04B 2001/0416* (2013.01)

(58) Field of Classification Search
CPC .. H04B 1/0458; H04B 17/102; H04B 17/103; H04B 1/006; H04B 1/04; H04B 1/0475; H04B 1/0483; H04B 1/1615; H04B 2001/0408

See application file for complete search history.

(56) References Cited

U.S. PATENT DOCUMENTS

| | | | |
|---|---|---|---|
| 5,933,330 | A | 8/1999 | Beutler et al. |
| 8,289,102 | B2 | 10/2012 | Yamamoto et al. |
| 8,606,198 | B1 | 12/2013 | Wright |
| 9,755,670 | B2 | 9/2017 | Chen et al. |

(Continued)

OTHER PUBLICATIONS

U.S. Appl. No. 17/449,331, filed Sep. 29, 2021, Radio Frequency System Arranged To Pass Coupled Power.

*Primary Examiner* — Nhan T Le
(74) *Attorney, Agent, or Firm* — Knobbe, Martens, Olson & Bear, LLP

(57) ABSTRACT

Aspects of this disclosure relate to a radio frequency module with a radio frequency coupler and a coupler switching circuit. The coupler switching circuit can provide an indication of radio frequency power generated by the radio frequency coupler to a first input/output port. The coupler switching circuit can also pass an indication of radio frequency power received at the first input/output port to a second input/output port, and pass an indication of radio frequency power received at the second input/output port to the first input/output port.

20 Claims, 16 Drawing Sheets

(56) References Cited

U.S. PATENT DOCUMENTS

| | | | |
|---|---|---|---|
| 10,147,994 B2 | 12/2018 | Jayaraman et al. | |
| 10,498,004 B1 | 12/2019 | Ji et al. | |
| 11,223,377 B2 * | 1/2022 | Kani | H04B 1/0458 |
| 11,336,312 B2 * | 5/2022 | Takeuchi | H04B 1/006 |
| 2011/0003563 A1 * | 1/2011 | Gorbachov | H04B 1/44 |
| | | | 333/101 |
| 2016/0172737 A1 | 6/2016 | Srirattana et al. | |
| 2018/0102581 A1 | 4/2018 | Jayaraman et al. | |
| 2022/0103192 A1 | 3/2022 | Pehlke | |

\* cited by examiner

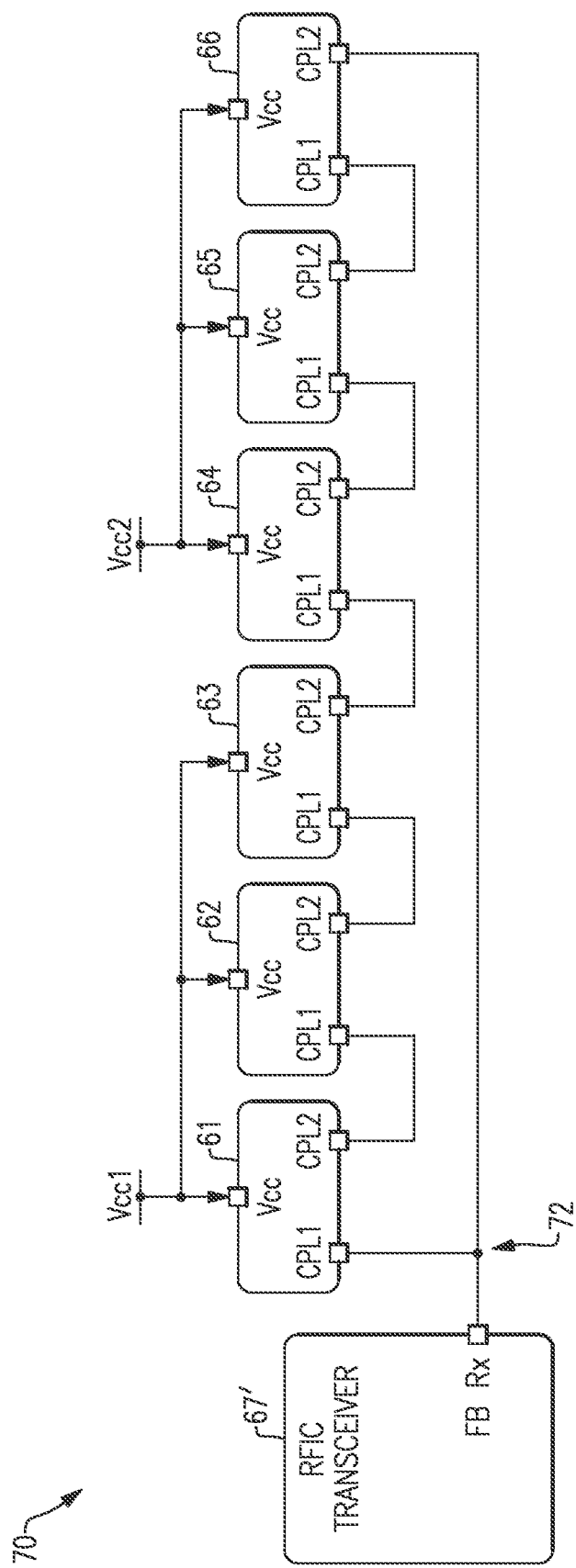

MODULE ARRANGED TO BIDIRECTIONALLY PASS COUPLED POWER SIGNAL

CROSS REFERENCE TO PRIORITY APPLICATION

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/085,835, filed Sep. 30, 2020 and titled "MODULE ARRANGED TO BI-DIRECTIONALLY PASS COUPLER SIGNAL," the disclosure of which is hereby incorporated by reference in its entirety.

BACKGROUND

Technical Field

Embodiments of this disclosure relate to radio frequency modules and radio frequency systems.

Description of Related Technology

Radio frequency (RF) communication systems can be used for transmitting and/or receiving signals of a wide range of frequencies. For example, an RF communication system can be used to wirelessly communicate RF signals in a frequency range from about 30 kHz to about 300 GHz, such as in the range of about 410 megahertz (MHz) to about 7.125 gigahertz (GHz) for Fifth Generation (5G) cellular communications in Frequency Range 1 (FR1).

Example of RF communication systems can include without limitation mobile phones, tablets, base stations, network access points, customer-premises equipment (CPE), laptops, and wearable electronics.

In certain applications, RF communications systems can generate a plurality of RF signals concurrently for transmission. In such RF communications systems, determining power associated with an individual radio frequency signal can be useful.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a radio frequency system that includes a first radio frequency module having a first port, a second radio frequency module having a second port, and a third radio frequency module. The third radio frequency modules includes a first input/output port electrically connected to the first port, a second input/output port electrically connected to the second port, and a coupler switching circuit. The coupler switching circuit is configured to pass an indication of radio frequency power received at the first input/output port to the second input/output port and pass an indication of radio frequency power received at the second input/output port to the first input/output port.

The third radio frequency module can include a radio frequency coupler. The coupler switching circuit can provide an indication of radio frequency power from the radio frequency coupler to the first input/output port. The indication of radio frequency power from the radio frequency coupler can be an indication of forward radio frequency power. The coupler switching circuit can provide an indication of reflected radio frequency power from the radio frequency coupler to the first input/output port. The coupler switching circuit can provide the indication of radio frequency power from the radio frequency coupler to the second input/output port.

The radio frequency system can include a feedback receiver having an input port electrically coupled to a daisy chain that includes the coupler switching circuit. The daisy chain can include a coupler switching circuit of the first radio frequency module and a coupler switching circuit of the second radio frequency module. The radio frequency system can include a switch coupled between the input port of the feedback receiver and the daisy chain. The feedback receiver can include a second port electrically coupled to the daisy chain. The daisy chain can include a T-connection that combines two traces, in which the daisy chain is connected to a single input port of the feedback receiver. The coupler switching circuit can be configured to pass an indication of radio frequency power having a direct current component and a radio frequency component. The radio frequency system can also include a direct current blocking element coupled between the daisy chain and the input port of the feedback receiver. The third radio frequency module and another module in the daisy chain can concurrently output radio frequency signals. The feedback receiver can receive indications of radio frequency power associated with each of the concurrently output radio frequency signals. The radio frequency system can pass the indications of radio frequency power in opposite directions in the daisy chain. The third radio frequency module and another module in the daisy chain can concurrently output radio frequency signals in a carrier aggregation mode. The third radio frequency module and another module in the daisy chain can concurrently output radio frequency signals in a dual connectivity mode.

The second module can include a third port and a second coupler switching circuit. The second coupler switching circuit can pass an indication of radio frequency power received at the second port to the third port and pass an indication of radio frequency power received at the third port to the second port.

Another aspect of this disclosure is a method of passing coupled power signals. The method includes providing a first coupled power signal generated by a first radio frequency module to a daisy chain, and providing a second coupled power signal generated by a second radio frequency module to the daisy chain such that the first coupled power signal and the second coupled power signal propagate in opposite directions in the daisy chain. The method is performed while the first radio frequency module and the second radio frequency module are transmitting concurrently.

The method can include receiving the first coupled power signal and the second coupled power signal at a feedback receiver. The method can include causing at least one adjustment to a transmit path of the first radio frequency module based on an output signal from the feedback receiver.

The method can include passing the first coupled power signal through circuitry of a third radio frequency module in the daisy chain.

Another aspect of this disclosure is a wireless communication device that includes a radio frequency system and one or more antennas in communication with the radio frequency system. The radio frequency system includes a first radio frequency module having a first port, a second radio frequency module having a second port, and a third radio frequency module. The third radio frequency module includes a first input/output port electrically connected to the first port, a second input/output port electrically connected to the second port, and a coupler switching circuit. The coupler switching circuit is configured to pass an indication of radio frequency power received at the first input/output port to the second input/output port and pass an indication of radio frequency power received at the second input/output port to the first input/output port. The one or more antenna are configured to a transmit radio frequency signal generated by the first radio frequency module.

The wireless communication device can be a mobile phone.

Another aspect of this disclosure is a radio frequency that includes a first input/output port, a second input/output port, a radio frequency coupler, and a coupler switching circuit. The coupler switching circuit is configured to pass an indication of radio frequency power received at the first input/output port to the second input/output port, pass an indication of radio frequency power received at the second input/output port to the first input/output port, and provide an indication of radio frequency power from the radio coupler to the first input/output port.

The coupler switching circuit can provide the indication of radio frequency power from the radio frequency coupler to the second input/output port.

The indication of radio frequency power can be an indication of forward radio frequency power. The coupler switching circuit can provide an indication of reflected radio frequency power from the radio frequency coupler to the first input/output port. The coupler switching circuit can provide the indication of radio frequency power to the second input/output port and provide the indication of reflected radio frequency power to the second input/output port.

The radio frequency module can include a power amplifier having an output electrically coupled to the radio frequency coupler. The radio frequency module can include one or more circuit elements in a signal path between the output of the power amplifier and the radio frequency coupler. The one or more circuit elements can include a switch. The one or more circuit elements can include a filter.

The radio frequency module can include a second radio frequency coupler. The coupler switching circuit can provide an indication of radio frequency power from second radio frequency coupler to the first input/output port.

The coupler switching circuit can includes a plurality of switches arranged to pass the indication of radio frequency power received at the first input/output port to the second input/output port, pass the indication of radio frequency power received at the second input/output port to the first input/output port, and provide the indication of radio frequency power from the radio coupler to the first input/output port. The plurality of switches can include a switch configured to selectively electrically connect a termination impedance to a port of the radio frequency coupler.

Another aspect of this disclosure is a radio frequency system that includes a first radio frequency module including a first port and a first coupler switching circuit, a second radio frequency module including a second coupler switching circuit, and a third radio frequency module. The third radio frequency module includes a first input/output port, a second input/output port, a radio frequency coupler, and a third coupler switching circuit. The third coupler switching circuit is included in a daisy chain that also includes the first and second coupler switching circuits. The third coupler switching circuit is configured to pass an indication of radio frequency power received at the first input/output port to the second input/output port, pass an indication of radio frequency power received at the second input/output port to the first input/output port, and provide an indication of radio frequency power from the radio coupler to the first input/output port.

The third coupler switching circuit can provide the indication of radio frequency power from the radio frequency coupler to the second input/output port.

The indication of radio frequency power can be an indication of forward radio frequency power. The third coupler switching circuit can provide an indication of reflected radio frequency power from the radio frequency coupler to the first input/output port.

The third radio frequency module can include a second radio frequency coupler. The third coupler switching circuit can provide an indication of radio frequency power from second radio frequency coupler to the first input/output port.

The first radio frequency module and the second radio frequency module can be configured to transmit concurrently. The radio frequency system can concurrently pass a first indication of radio frequency power from the first radio frequency module and a second indication of radio frequency power from the second radio frequency module in different directions in the daisy chain.

The radio frequency system can include a feedback receiver having an input port electrically coupled to the daisy chain.

Another aspect of this disclosure is a wireless communication device that includes a radio frequency module and an antenna in communication with the radio frequency module. The radio frequency module includes a first input/output port, a second input/output port, a radio frequency coupler, and a coupler switching circuit. The coupler switching circuit is configured to pass an indication of radio frequency power received at the first input/output port to the second input/output port, pass an indication of radio frequency power received at the second input/output port to the first input/output port, and provide an indication of radio frequency power from the radio coupler to the first input/output port. The antenna is configured to transmit a radio frequency signal generated by the radio frequency module.

The wireless communication device can include two additional radio frequency modules each including a respective coupler circuit that is included in a daisy chain with the coupler circuit of the radio frequency module. The wireless communication device can concurrently pass two indications of radio frequency power in opposing directions in the daisy chain.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

The present disclosure relates to U.S. patent application Ser. No. 17/449,331, titled "RADIO FREQUENCY SYSTEM ARRANGED TO PASS COUPLED POWER," filed on even date herewith, the entire disclosure of which is hereby incorporated by reference herein.

BRIEF DESCRIPTION OF THE DRAWINGS

Embodiments of this disclosure will now be described, by way of non-limiting example, with reference to the accompanying drawings.

FIG. 7A is a schematic diagram of a radio frequency system with a bidirectional daisy chain of coupler switching circuits for a single feedback receiver input according to an embodiment.

DETAILED DESCRIPTION OF CERTAIN EMBODIMENTS

Figure 1:
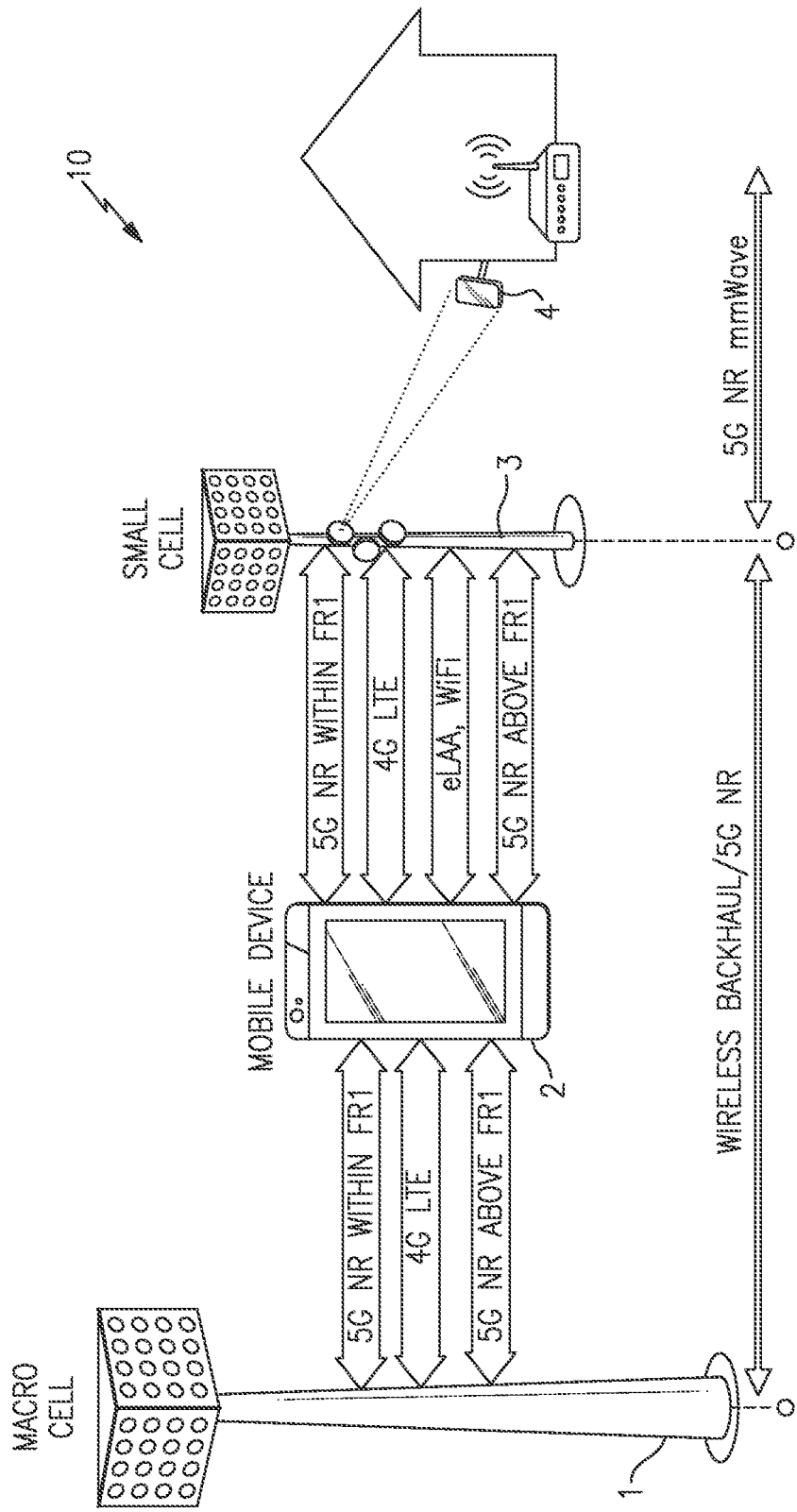
FIG. 1 is a schematic diagram of one example of a communication network.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and are not intended to affect the meaning or scope of the claims.

Cellular telephony radio front-ends can include feedback receivers that are used to measure the forward and/or reflected power on a given active transmit path for a variety of applications. A feedback receiver can alternatively be referred to as a measurement receiver. An example application includes measuring forward power and determining whether absolute power is above a threshold limit for a specific absorbed radiation (SAR) regulatory specification, and taking action such as reducing the power to prevent excessive radiated power amplitudes. Another example application includes measuring forward power and determining a relative amplitude with respect to a 50 Ohm in-factory reference measurement made during initial calibration of a product to determine how close the power is to the specific target power, and taking action such as adjusting the power up and/or down to get back to a reference value. Another example application includes measuring reflected power (and perhaps with knowledge of the forward power setting or a specific measurement of the forward power as well) determining if the difference between forward and reflected power exceeds a threshold and the antenna loading/de-tuning/performance has become unacceptably poor and a different antenna should to be used for the given use case/signal. Then the radio can perform a change in connectivity or antenna swap. Another example application includes measuring a detailed complex real time ratio of the forward and reflected signal in order to assess the actual complex impedance of the antenna. Based on this ratio, the radio can adjust antenna tuning settings to better set aperture/complex input impedance/both for the antenna, or to make adjustments to the digital pre-distortion of the transmitter (DPD) to better optimize the linearity/efficiency/power capability into the variable antenna load.

Such forward and/or reflected power measurements can be achieved by coupling off a relatively small amount of the forward and/or reflected power and directing the coupled energy to a radio frequency (RF) path that can be connected back to one or more feedback receiver inputs on a transceiver. The amount of coupled RF power can be relatively small so as not to incur significant insertion loss from losing useful signal energy. A radio frequency coupler can provide a coupled power signal that is an indication of radio frequency power.

Technical solutions for connecting a coupled RF path back to a feedback receiver include (1) star connection where each individual transmit coupler is connected in parallel back to a consolidation switch and to the appropriate feedback receiver input(s) or (2) a daisy chain where each coupler has a local switch to connect either (a) the local coupler or (b) an input to the output. The daisy chain path from input to output can be a bypass path to enable several radio frequency modules to be connected together and eventually connect to a feedback receiver input of a transceiver. In a daisy chain, circuitry of several radio frequency modules are connected in series and can then be connected to a dedicated feedback receiver input. In certain applications, multiple clusters of daisy chained modules can be connected to a consolidation switch, which then connects to a feedback receiver input of a transceiver.

A challenge for non-stand-alone (NSA) or E-UTRAN New Radio-Dual Connectivity (EN-DC) operation in Fifth Generation (5G) cellular communications is intermodulation distortion (IMD) and coupling/leakage of transmit carrier power when more than one transmit carrier is active concurrently. In such EN-DC dual connectivity for NSA operation or uplink (UL) carrier aggregation (CA) operation, leakage of a second transmit path power onto a first transmit path for measurement can reduce accuracy and/or limit a useful dynamic range of a feedback receiver. For example, isolation can be challenging when a low power reflected power signal is being routed in the presence of a high power blocker.

Some schemes further make flexible use of programming the supply domains and first transmit path or second transmit path operation between different modules, in such a way that the coupled path isolation and transmit leakage management is also flexibly programmed to provide isolation and avoid a first transmit path coupled path from going through a second transmit path active module, and vice-versa. This can be further complicated by the availability of only a single feedback receiver input.

Aspects of this disclosure relate to radio frequency module with input/output ports for providing and/or passing an indication of radio frequency power. Two input/output ports of the radio frequency module can be reconfigurable such that each of these input/output ports can (a) function as an input to receive a coupled power signal from another radio frequency module and provide the coupled power signal to the other input/output port, (b) function as an output to provide a coupled power signal from another radio frequency module received at the other input/output port, and (c) output a coupled power signal from a radio frequency coupler of the radio frequency module. A coupled power signal provides an indication of radio frequency power. A forward power measurement or a reflected power measurement from a radio frequency coupler, such as a directional coupler, of the radio frequency module can be output at either of the two input/output ports. A coupler switching circuit can be configured to (a) enable a daisy chain to bypass from a first of the two input/output ports as an input to a second of the two input/output ports as an output or (b) enable the daisy chain to bypass from the second of the two input/output ports as an input to the first of the two input/output ports as an output.

Circuitry of a plurality of such radio frequency modules can be connected together in a daisy chain. The daisy chain can be a loop between two different feedback receiver inputs. Coupled power from two actively transmitting modules of the plurality of radio frequency modules can be routed in opposite directions to an appropriate respective feedback receiver input without overlapping or running one transmit path coupled power through a radio frequency module with another concurrently active transmit path for isolation and/or other considerations. A coupler switching circuit in a radio frequency module can enable bidirectional routing for a coupled power signal generated by a radio frequency coupler of the radio frequency module. With bidirectional routing, the coupled power signal can be routed either clockwise or counter-clockwise around the daisy chain back to a feedback receiver input.

In certain instances, a daisy chain loop including circuitry of a plurality of radio frequency modules can be connected to a single node that is electrically connected to a single feedback receiver input. By maintaining programmable bidirectionality of the coupled power around the daisy chain loop, a first transmit path coupled power signal can be routed to the single feedback receiver input without passing through a radio frequency module with a concurrently active second transmit path. Similarly, the second transmit path coupled power signal can be routed to the single feedback receiver input without passing through a radio frequency module with the concurrently active first transmit path.

Radio frequency modules and radio frequency systems disclosed herein can achieve a variety of advantages over other technical solutions. For example, a daisy chain can be connected to a feedback receiver input without a consolidation switch external to radio frequency modules of the daisy chain. Technical solutions disclosed herein can scale with an arbitrary number of connected radio frequency modules. There can be no significant isolation issues between two concurrently active transmit paths because a coupled power signal from one transmit path can be routed away from a module with another concurrently active transmit path. Technical solutions disclosed herein can be realized in a relatively small physical area and can reduce and/or minimize long routes on a phone board from a radio frequency module positioned relatively far away from a feedback receiver. Technical solutions disclosed herein can implement daisy chaining for coupled power signals with simplified overhead, control, and/or timing.

5G Technology and Example Communication Network

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and is currently in the process of developing Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a mobile device 2, a small cell base station 3, and a stationary wireless device 4. Embodiments disclosed herein can be implemented in the communication network 10, for example.

The illustrated communication network 10 of FIG. 1 supports communications using a variety of technologies, including, for example, 4G LTE, 5G NR, and wireless local area network (WLAN), such as WiFi. In the communication network 10, dual connectivity can be implemented with concurrent 4G LTE and 5G NR communication with the mobile device 2. Although various examples of supported communication technologies are shown, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 1, the mobile device 2 communicates with the macro cell base station 1 over a communication link that uses a combination of 4G LTE and 5G NR technologies. The mobile device 2 also communications with the small cell base station 3. In the illustrated example, the mobile device 2 and small cell base station 3 communicate over a communication link that uses 5G NR, 4G LTE, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

In certain implementations, the mobile device 2 communicates with the macro cell base station 2 and the small cell base station 3 using 5G NR technology over one or more frequency bands that within Frequency Range 1 (FR1) and/or over one or more frequency bands that are above FR1. The one or more frequency bands within FR1 can be less than 6 GHz. For example, wireless communications can utilize FR1, Frequency Range 2 (FR2), or a combination thereof. In one embodiment, the mobile device 2 supports a HPUE power class specification.

The illustrated small cell base station 3 also communicates with a stationary wireless device 4. The small cell base station 3 can be used, for example, to provide broadband service using 5G NR technology. In certain implementations, the small cell base station 3 communicates with the stationary wireless device 4 over one or more millimeter wave frequency bands in the frequency range of 30 GHz to 300 GHz and/or upper centimeter wave frequency bands in the frequency range of 24 GHz to 30 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 10 of FIG. 1 includes the macro cell base station 1 and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 10 is illustrated as including two base stations, the communication network 10 can be implemented to include more or fewer base stations and/or base stations of other types. As shown in FIG. 1, base stations can communicate with one another using wireless communications to provide a wireless backhaul. Additionally or alternatively, base stations can communicate with one another using wired and/or optical links.

The communication network 10 of FIG. 1 is illustrated as including one mobile device and one stationary wireless device. The mobile device 2 and the stationary wireless device 4 illustrate two examples of user devices or user equipment (UE). Although the communication network 10 is illustrated as including two user devices, the communication network 10 can be used to communicate with more or fewer user devices and/or user devices of other types. For example, user devices can include mobile phones, tablets, laptops, IoT devices, wearable electronics, and/or a wide variety of other communications devices.

User devices of the communication network 10 can share available network resources (for instance, available frequency spectrum) in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user device a unique code, space-divisional multiple access (SDMA) in which beamforming is used to provide shared access by spatial division, and non-orthogonal multiple access (NOMA) in which the power domain is used for multiple access. For example, NOMA can be used to serve multiple user devices at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to M*B*$\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Carrier Aggregation

Figure 2A:
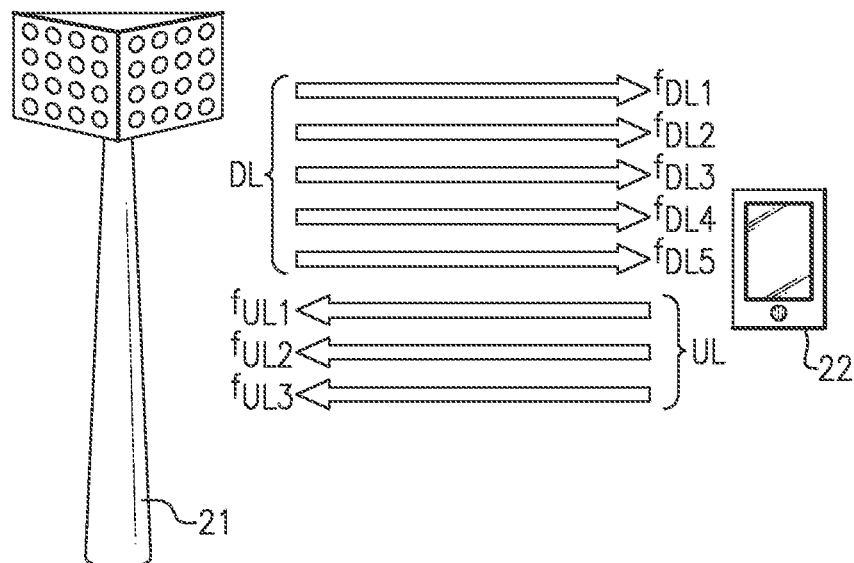
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations. Carrier aggregation can present technical challenges for measuring power of individual carriers. Radio frequency systems disclosed herein can measure power associated with one or more transmit paths in carrier aggregation applications. Embodiments disclosed herein can be implemented in carrier aggregation applications.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
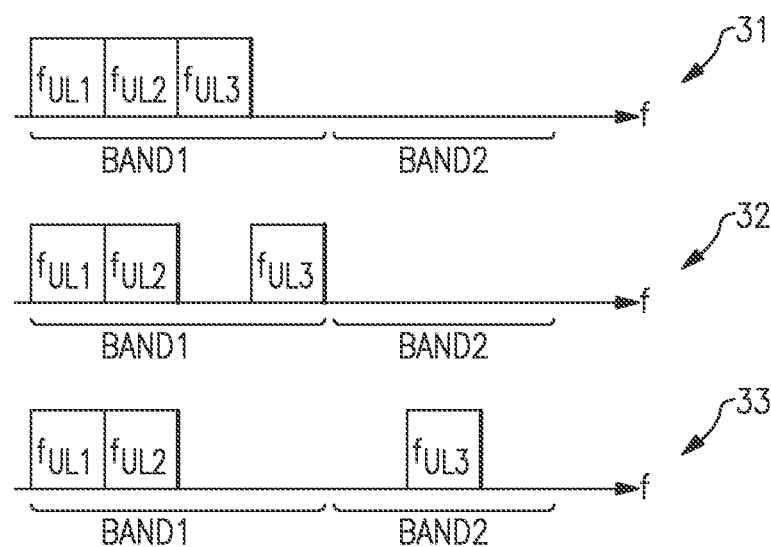
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

With reference to FIGS. 2A and 2B, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Dual Connectivity

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and can involve both 4G and 5G carriers being simultaneously transmitted from a user equipment (UE). EN-DC can present technical challenges for measuring power associated with individual transmit paths. Radio frequency systems disclosed herein can measure power associated with one or more transmit paths in dual connectivity applications. Embodiments disclosed herein can be implemented in dual connectivity applications.

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

Figure 3:
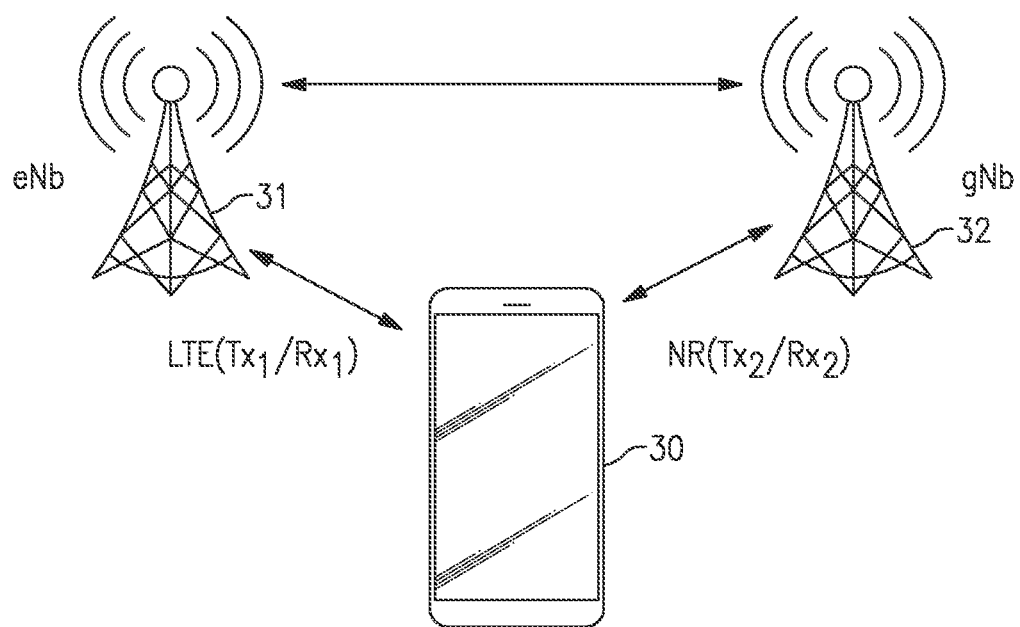
FIG. 3 is a diagram of an example dual connectivity network topology.

FIG. 3 is a diagram of an example dual connectivity network topology. This architecture can leverage LTE legacy coverage to ensure continuity of service delivery and the progressive rollout of 5G cells. A UE 30 can simultaneously transmit dual uplink LTE and NR carriers. The UE 30 can transmit an uplink LTE carrier Tx1 to the eNB 31 while transmitting an uplink NR carrier Tx2 to the gNB 32 to implement dual connectivity. Any suitable combination of uplink carriers Tx1, Tx2 and/or downlink carriers Rx1, Rx2 can be concurrently transmitted via wireless links in the example network topology of FIG. 3. The eNB 31 can provide a connection with a core network, such as an Evolved Packet Core (EPC). The gNB 32 can communicate with the core network via the eNB 31. Control plane data can be wirelessly communicated between the UE 30 and eNB 31. The eNB 31 can also communicate control plane data with the gNB 32.

In the example dual connectivity topology of FIG. 3, any suitable combinations of standardized bands and radio access technologies (e.g., FDD, TDD, SUL, SDL) can be wirelessly transmitted and received. This can present technical challenges related to having multiple separate radios and bands functioning in the UE 30. With a TDD LTE anchor point, network operation may be synchronous, in which case the operating modes can be constrained to Tx1/Tx2 and Rx1/Rx2, or asynchronous which can involve Tx1/Tx2, Tx1/Rx2, Rx1/Tx2, or Rx1/Rx2. When the LTE anchor is a frequency division duplex (FDD) carrier, the TDD/FDD inter-band operation can involve simultaneous Tx1/Rx1/Tx2 and Tx1/Rx1/Rx2.

Radio Frequency Modules with Coupler Switching Circuit and Daisy Chain Architecture of Coupler Switching Circuits Radio frequency modules disclosed herein include coupler switching circuits arranged to bidirectionally pass a coupled power signal between input/output ports of a radio frequency module. Coupler switching circuits in a plurality of modules can be arranged in a daisy chain. A coupler switching circuit of an individual radio frequency module can provide a coupled power signal from a radio frequency coupler to an input/output port to cause the coupled power signal to propagate in a particular direction through the daisy chain to a feedback receiver input port. The coupler switching circuit can cause the coupled power signal to propagate in opposite directions though the daisy chain in different states.

Daisy chained coupler switching circuit architectures disclosed herein can be scalable and achieve high isolation between coupled power signals associated with different transmit paths. In some instances, daisy chained coupler switching circuit architectures disclosed herein can be implemented without a switch external to the radio frequency modules between the daisy chain and an input of a feedback receiver. The coupler switching circuits and related daisy chains can be implemented in applications where two or more transmit paths are concurrently active, such as carrier aggregation applications and/or dual connectivity applications.

Figure 4A:
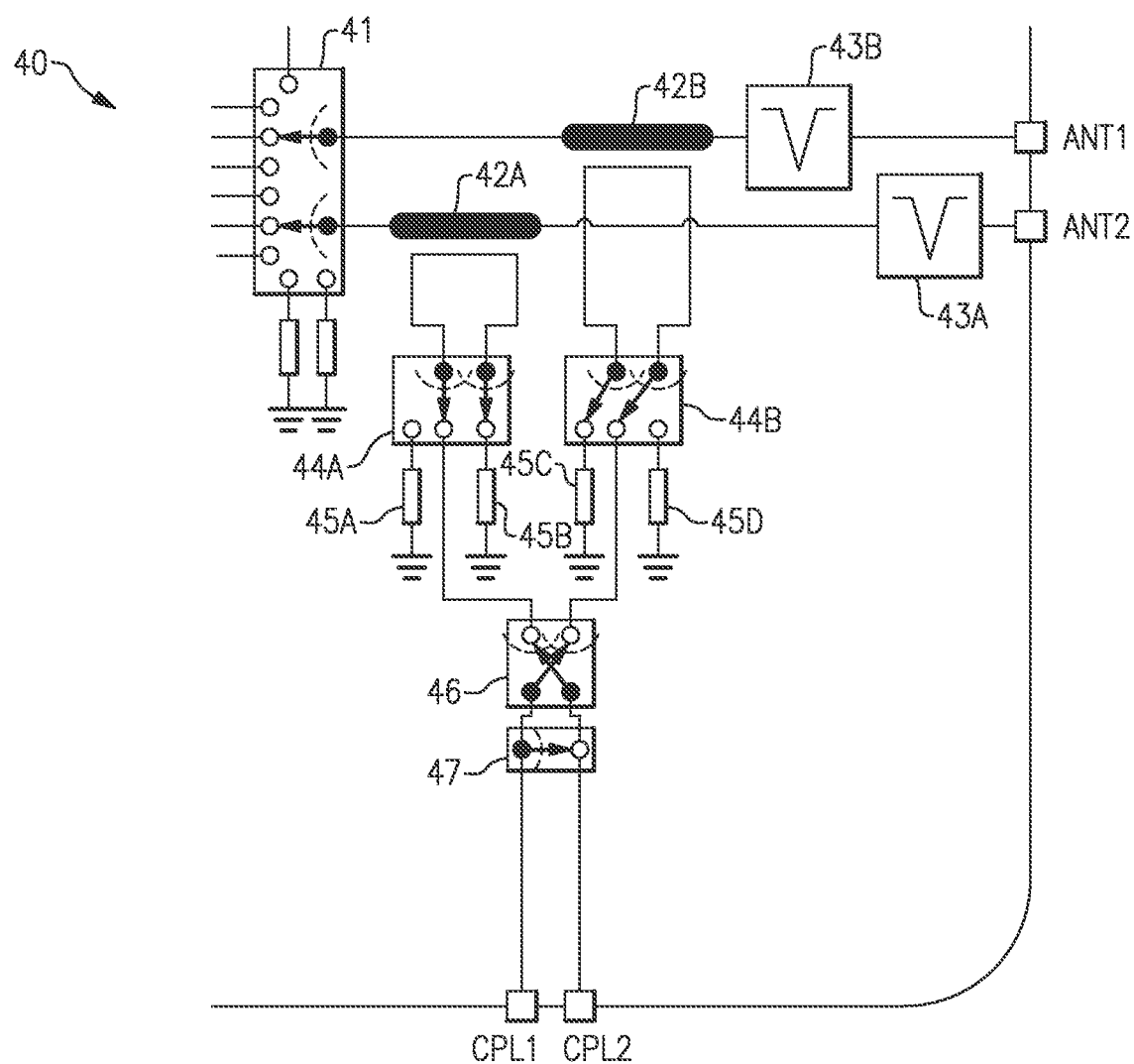
FIG. 4A is a schematic diagram of a portion of a radio frequency module with a bidirectional daisy chain coupler interface according to an embodiment.

FIG. 4A is a schematic diagram of a portion of a radio frequency module 40 with a bidirectional daisy chain coupler interface according to an embodiment. The radio frequency module 40 can be implemented with one less contact (e.g., pin) compared to some other technical solutions. The radio frequency module 40 can improve isolation of coupled power signals. The radio frequency module 40 can be implemented without external switching for a daisy chain in certain applications. As illustrated, the radio frequency module 40 includes a multi-throw switch 41, radio frequency couplers 42A and 42B, notch filters 43A and 43B, termination and output switches 44A and 44B, termination impedances 45A, 45B, 45C, 45D, a coupled power output switch 46, and a bypass switch 47. In the radio frequency module 40, the termination and output switches 44A and 44B, the coupled power output switch 46, and the bypass switch 47 together implement a coupler switching circuit.

A bidirectional daisy chain coupler interface of the radio frequency module 40 enables two input/output ports CPL1 and CPL2 to each be (a) an output for a coupled power signal generated by a radio frequency coupler 42A or 42B of the radio frequency module 40, (b) an input for receiving a coupled power signal from another module, or (c) an output for passing a coupled power signal from another module received at the other input/output port.

For example, the coupled power output switch 46 can electrically connect either radio frequency coupler 42A or radio frequency coupler 42B to either a first input/output port CPL1 or a second input/output port CPL2. This can enable the radio frequency module 40 to output coupled radio frequency power to propagate in either direction in a daisy chain. The coupled power output switch 46 can provide either a forward coupled power signal or a reverse coupled power signal depending on a state of a termination and output switch 44A or 44B.

The bypass switch 47 can enable a coupled power signal received at the first input/output port CPL1 to be passed to the second input/output port CPL2. Similarly, the bypass switch 47 can enable a coupled power signal received at the second input/output port CPL2 to be passed to the first input/output port CPL1. Accordingly, the bidirectional daisy chain coupler interface of the radio frequency module 40 can implement a bidirectional pass through of coupled power signals. The input/output ports CPL1 and CPL2 can be implemented by any suitable contacts, such as one or more pins, one or more pads, one or more bumps, the like, or any suitable combination thereof.

The multi-throw switch 41 can be a multi-throw double-pole switch as illustrated. The multi-throw switch 41 can receive a radio frequency signal for transmission. The radio frequency signal can be generated by a power amplifier of the radio frequency module 40. In certain applications, different power amplifiers can be coupled to respective notch filters 43A and 43B via the multi-throw switch 41. The multi-throw switch 41 can be coupled to a plurality of transmit signal paths, which can include different filters. The multi-throw switch 41 can provide an output from a selected transmit path to the first radio frequency coupler 42A. The multi-throw switch 41 can provide an output from a selected transmit path to the second radio frequency coupler 42B.

The first radio frequency coupler 42A can couple a relatively small amount of forward or reflected power propagating between the multi-throw switch 41 to the notch filter 43A. The reflected power can be referred to as reverse power. The first termination and output switch 44A can connect one port of the first radio frequency coupler 42A to the coupled power output switch 46 and another port to one of the termination impedances 45A or 45B. The termination impedances 45A, 45B, 45C, and 45D can each include a resistor.

The first termination and output switch 44A can be set to a first state corresponding to providing a forward power measurement or a second state corresponding to providing a reverse power measurement. In FIG. 4A, the first termination and output switch 44A is shown in the first state where the termination impedance 45B is connected to a port of the radio frequency coupler 42A. The first termination and output switch 44B can toggle between the first state and the second state. In the second state, the port of the first radio frequency coupler 42A illustrated in FIG. 4A as being connected to the termination impedance 45B is instead connected to the coupled power output switch 46 and the port of the first radio frequency coupler 42A illustrated in FIG. 4A as being connected to the coupled power output switch 46 is instead connected termination impedance 45A.

The second radio frequency coupler 42B can couple a relatively small amount of forward or reflected power propagating between the multi-throw switch 41 to the notch filter 43B. The second termination and output switch 44B can connect one port of the second radio frequency coupler 42B to the coupled power output switch 46 and another port to one of the termination impedances 45C or 45D.

The second termination and output switch 44B can be set to a first state corresponding to providing a forward power measurement or a second state corresponding to providing a reverse power measurement. In FIG. 4A, the second termination and output switch 44B is shown in the second state. The second termination and output switch 44B can toggle between the first state for providing forward coupled power and the second state for providing reflected coupled power.

The coupled power output switch 46 can electrically connect the first termination and output switch 44A the first input/output port CPL1 or the second input/output port CPL 2. The coupled power output switch 46 can electrically connect the second termination and output switch 44B to the first input/output port CPL1 or the second input/output port CPL 2. In certain instances, the coupled power output switch 46 can provide a single coupled power signal to either the input/output port CPL1 or the input/output port CPL2. The coupled power output switch 46 can provide coupled power signals from radio frequency couplers 42A and 42B to different input/output ports CPL1 and CPL2 concurrently in some applications.

The bypass switch 47 can provide a bypass path between the first input/output port CPL1 and the second input/output port CPL2. A coupled power signal received at either one of these ports can be provided to the other one of these ports. The bypass switch 47 can be turned off when the radio frequency module 40 is providing a coupled power signal from a radio frequency coupler 42A or 42B to an input/output port CPL1 or CPL2. When the bypass switch 47 is turned off, the input/output ports CPL1 and CPL2 can be electrically isolated from each other.

Figure 4B:
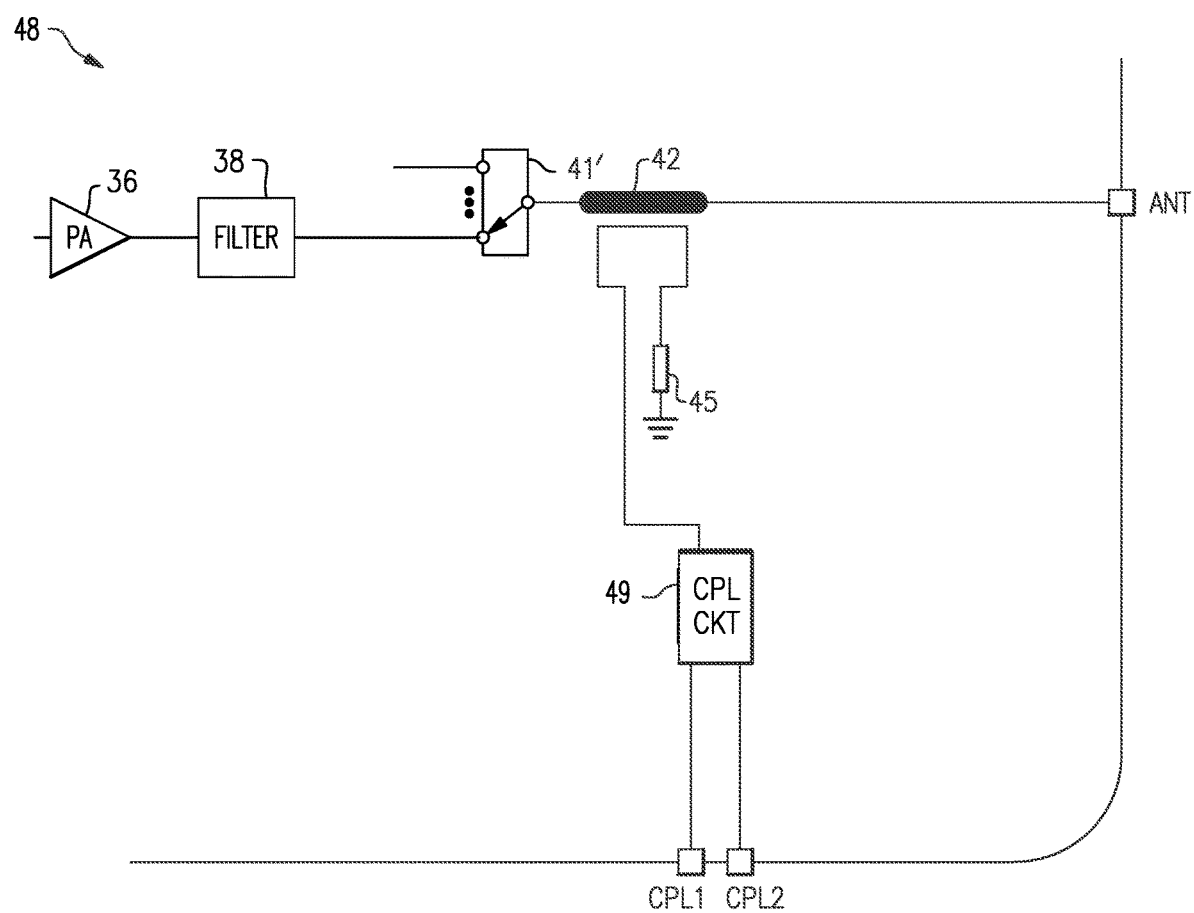
FIG. 4B is a schematic diagram of a portion of a radio frequency module with a bidirectional daisy chain coupler interface according to an embodiment.

FIG. 4B is a schematic diagram of a portion of a radio frequency module 48 with a bidirectional daisy chain coupler interface according to an embodiment. The radio frequency module 48 can be implemented with fewer contacts compared to some other technical solutions and/or improve isolation of coupled power signals. The radio frequency module 48 can be implemented without external switching for a daisy chain in certain applications. As illustrated, the radio frequency module 48 includes a power amplifier 36, a filter 38, a multi-throw switch 41', a radio frequency coupler 42 connected to a termination impedance 45, and a coupler switching circuit 49, and a bypass switch 47. The coupler switching circuit 49 can be implemented in accordance with any suitable principles and advantages disclosed herein.

FIG. 4B illustrates that the radio frequency coupler 42 and the coupler switching circuit 49 can be included in a radio frequency module that also includes the power amplifier 36. One or more circuit elements can be included in a signal path between the power amplifier 36 and the radio frequency coupler 42. For example, as illustrated, the filter 38 and switch 41' can be in a signal path between the power amplifier 36 and the radio frequency coupler 42. The coupled power signal generated by the radio frequency coupler 42 can be indicative of power of a radio frequency signal generated by the power amplifier 36.

Figure 5:
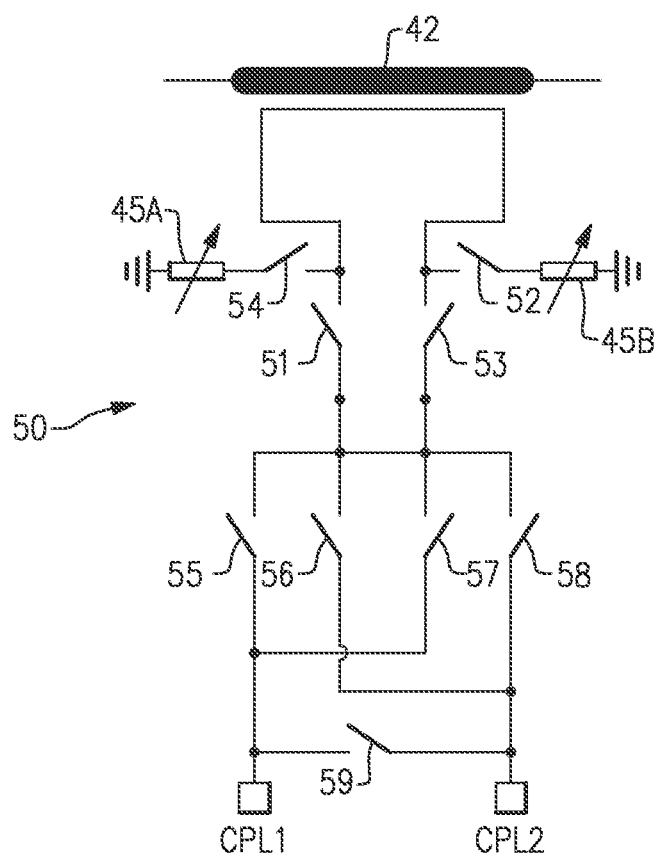
FIG. 5 is a schematic diagram of a radio frequency coupler and a coupler switching circuit according to an embodiment.

FIG. 5 is a schematic diagram of a radio frequency coupler 42 and a coupler switching circuit 50 according to an embodiment. The coupler switching circuit 50 includes a plurality of switches 51, 52, 53, 54, 55, 56, 57, 58, and 59. The switches 51 to 59 of the coupler switching circuit 50 can be controlled by a control circuit to provide various connections between the radio frequency coupler 42 and the input/output ports CPL1 and CPL2 and between the input/output ports CPL1 and CPL2. FIG. 5 also illustrates that termination impedances 45A and 45B can be tunable. Any of the termination impedances disclosed herein can be tunable as suitable.

The coupler switching circuit 50 can provide a forward coupled power signal to the first input/output port CPL1. In this mode, the switches 51, 52, and 55 are On and the other illustrated switches of the coupler switching circuit 50 are Off. The coupler switching circuit 50 can provide a reverse coupled power signal to the first input/output port CPL1. In this mode, the switches 53, 54, and 57 are On and the other illustrated switches of the coupler switching circuit 50 are Off.

The coupler switching circuit 50 can provide a forward coupled power signal to the first input/output port CPL 2. In this mode, the switches 51, 52, and 56 are On and the other illustrated switches of the coupler switching circuit 50 are Off. The coupler switching circuit 50 can provide a reverse coupled power signal to the first input/output port CPL2. In this mode, the switches 53, 54, and 58 are On and the other illustrated switches of the coupler switching circuit 50 are Off.

The coupler switching circuit 50 can pass a coupled power signal from the first input/output port CPL1 to the second input/output port CPL2. Similarly, the coupler switching circuit 50 can pass a coupled power signal from the second input/output port CPL1 to the first input/output port CPL2. In the modes where a coupled power signal is passed from one input/output port to the other, the switch 59 is On and the other illustrated switches of the coupler switching circuit 50 are Off.

Table 1 below summarizes states of the switches 51 to 59 of the coupler switching circuit 50 for these modes. In Table 1, FWD CPL represents forward coupled power and REV CPL represents reverse coupled power.

TABLE 1

| Mode/Switch | 51/52 | 53/54 | 55 | 56 | 57 | 58 | 59 |
| --- | --- | --- | --- | --- | --- | --- | --- |
| FWD CPL -> CPL1 | On | Off | On | Off | Off | Off | Off |
| REV CPL -> CPL1 | Off | On | Off | Off | On | Off | Off |
| FWD CPL -> CPL2 | On | Off | Off | On | Off | Off | Off |
| REV CPL -> CPL2 | Off | On | Off | Off | Off | On | Off |
| CPL1 -> CPL2 | Off | Off | Off | Off | Off | Off | On |
| CPL2 -> CPL1 | Off | Off | Off | Off | Off | Off | On |

Figure 6A:
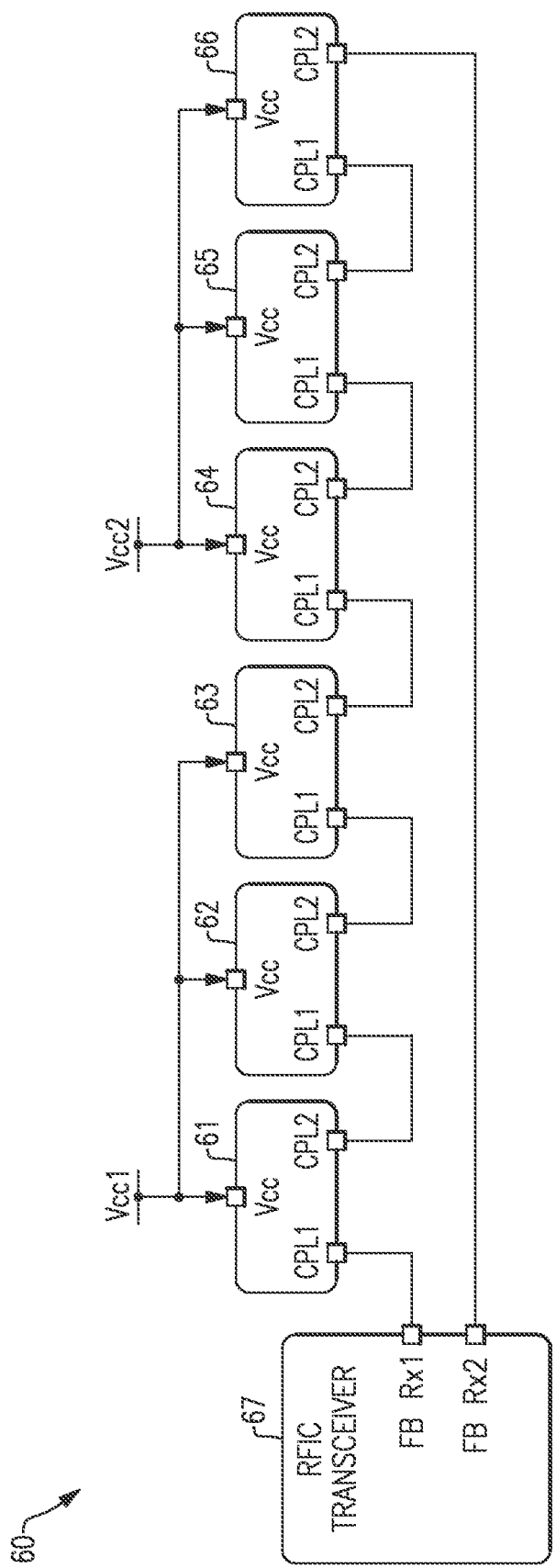
FIG. 6A is a schematic diagram of a radio frequency system with a bidirectional daisy chain of coupler switching circuits for dual feedback receiver inputs according to an embodiment.

FIG. 6A is a schematic diagram of a radio frequency system 60 with a bidirectional daisy chain of coupler switching circuits for dual feedback receiver inputs according to an embodiment. The illustrated daisy chain is arranged in a loop between two feedback receiver inputs. A coupler switching circuit can bidirectionally pass a coupled power signal through the daisy chain to either of the two feedback receiver inputs. A coupled power signal associated with a first transmit path can be routed through the daisy chain to the feedback receiver without passing through a radio frequency module with a second transmit path that is concurrently active. Similarly, a coupled power signal associated with the transmit path can be routed through the daisy chain to the feedback receiver without passing through a radio frequency module that includes the first transmit path when the first and second transmit paths are both active. High isolation can be achieved between coupled power signals regardless of a number of modules, a number of supply domains, or how transmit paths are connected.

As illustrated, the radio frequency system 60 includes a plurality of radio frequency modules 61, 62, 63, 64, 65, and 66 and a transceiver 67. The radio frequency modules 61, 62, 63, 64, 65, and 66 can be implemented with any suitable principles and advantages disclosed with reference to the radio frequency module 40 of FIG. 4A and/or the radio frequency module 48 of FIG. 4B. Each of the radio frequency modules 61 to 66 can include a coupler switching circuit, where the coupler switching circuits are together arranged in a daisy chain. The daisy chain can form a loop between feedback receiver inputs FB Rx1 and FB Rx2 of the transceiver 67. In the daisy chain, input/output ports of radio frequency modules are electrically connected to each other external to the radio frequency modules. The coupler switching circuits can be implemented in accordance with any suitable principles and advantages discussed with reference to FIGS. 4 and/or 5. Some or all of the radio frequency modules 61 to 66 can include one or more transmit paths. Two or more of the radio frequency modules 61 to 66 can include transmit paths that are concurrently active. The transmit paths can be concurrently active in a carrier aggregation application and/or a dual connectivity application.

In certain instances, radio frequency modules 61 to 66 can each have coupler switching circuits with any suitable combination of features disclosed herein. According to some other instances, radio frequency modules 61 and 66 at ends of the daisy chain can have simplified coupler switching circuits that are unidirectional. In some applications, the daisy chain can include one or more one or more radio frequency modules (e.g., one or more diversity receive modules) arranged to pass a coupled power signal between two input/output ports without the functionality to provide a coupled power signal generated by the radio frequency module to either of the two input/output ports.

In physical layout, the radio frequency modules 61 to 66 can be arranged to reduce and/or minimize the length of routes (1) between input/output ports of different radio frequency modules and (2) between input/output ports of the radio frequency modules at the ends of the daisy chain to the feedback receiver inputs. Accordingly, all of these routes can be relatively short in certain physical layouts. This can reduce and/or minimize parasitic capacitance associated with such routes.

The transceiver 67 includes a feedback receiver. The transceiver 67 can be implemented on an integrated circuit. The feedback receiver can process coupled power signals from the radio frequency modules 61 to 66. The feedback receiver can process a plurality of coupled power signals concurrently. The feedback receiver can include one or more receive paths that each include any suitable circuitry arranged to process a coupled power signal. For example, a receive path of a feedback receiver can include a low noise amplifier, a mixer, a filter, and an analog-to-digital converter. One or more adjustments to a transmit path can be performed in response to an output of the receive path of the feedback receiver.

Figure 6B:
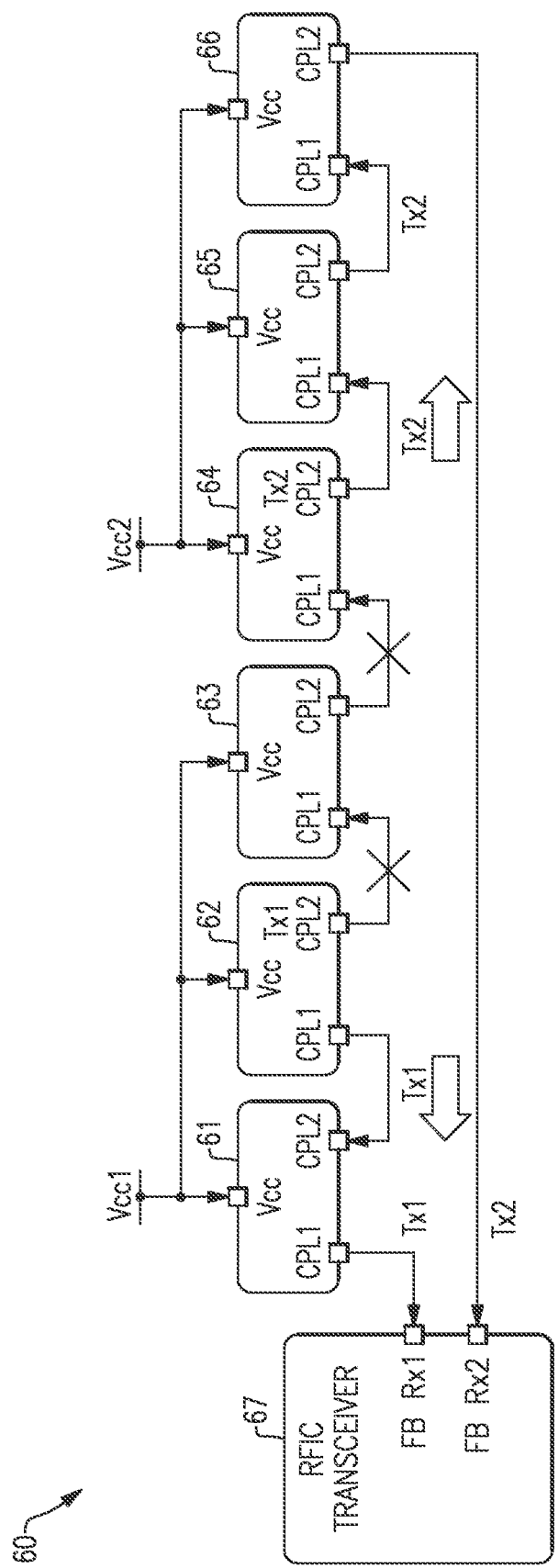
FIG. 6B is a schematic diagram of the radio frequency system of FIG. 6A in a state where two radio frequency modules are actively transmitting.

FIG. 6B is a schematic diagram of the radio frequency system 60 of FIG. 6A in a state where two radio frequency modules are actively transmitting. In FIG. 6B, the radio frequency modules 62 and 64 are concurrently transmitting. The first transmitting radio frequency module 62 can provide a coupled power signal at a first input/output port CPL1. For example, a coupler switching circuit of the first transmitting radio frequency module 62 can electrically connect a radio frequency coupler of the first transmitting radio frequency module 62 to the first input/output port CPL1 of the first transmitting radio frequency module 62. The second transmitting radio frequency module 64 can provide a coupled power signal at a second input/output port CPL2. For example, a coupler switching circuit of the second transmitting radio frequency module 64 can electrically connect a radio frequency coupler of the second transmitting radio frequency module 64 to the second input/output port CPL2 of the second transmitting radio frequency module 64.

As illustrated, the coupled power signals from the transmitting radio frequency modules 62 and 64 can propagate in different directions through the daisy chain to different respective feedback receiver inputs FB Rx1 and FB Rx2. The different directions are opposite directions as illustrated in FIG. 6B. Accordingly, in the state shown in FIG. 6B, coupled power signals do not propagate through another active transmitting radio frequency module in the daisy chain. This can achieve high isolation. In the state shown in FIG. 6B, coupled power signals do not propagate through coupler switching circuits of the radio frequency module 63.

FIG. 7A is a schematic diagram of a radio frequency system 70 with a bidirectional daisy chain of coupler switching circuits for a single feedback receiver input according to an embodiment. In the radio frequency system 70, a transceiver 67' includes one feedback receiver input FB Rx. The daisy chain of coupler switching circuits in the radio frequency system 70 is like the daisy chain in the radio frequency system 60 except that ends of the daisy chain connect at T connection 72 in the radio frequency system 70. The T connection 72 can be referred to as a T junction. The daisy chain of the radio frequency system 70 connects to a single feedback receiver input FB Rx. The daisy chain illustrated in FIG. 7A is implemented without switching external to the radio frequency modules 61 to 66.

Figure 7B:
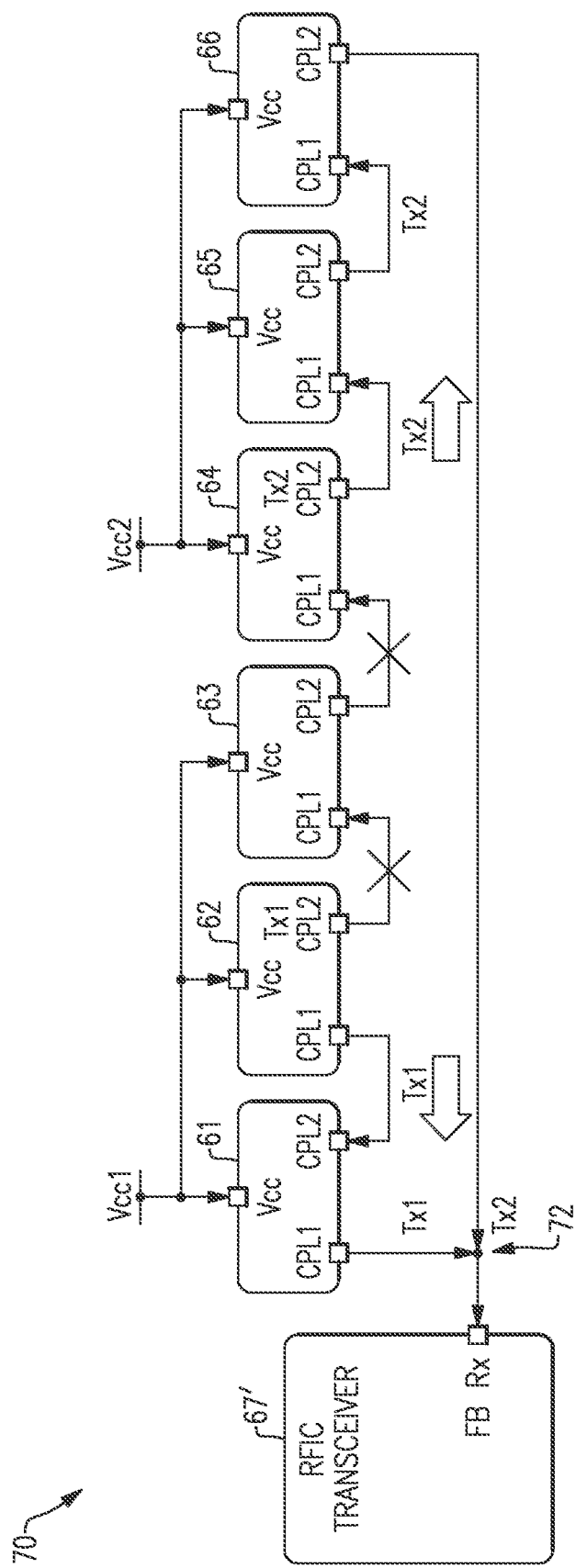
FIG. 7B is a schematic diagram of the radio frequency system of FIG. 7A in a state where two radio frequency modules are actively transmitting.

FIG. 7B is a schematic diagram of the radio frequency system 70 of FIG. 7A in a state where two radio frequency modules are actively transmitting. In FIG. 7B, the radio frequency modules 62 and 64 are concurrently transmitting. As illustrated, the coupled power signals from the transmitting radio frequency modules 62 and 64 can propagate in different directions through the daisy chain to the T connection 72. Accordingly, in the state shown in FIG. 7B, coupled power signals from an active transmitting radio frequency module do not propagate through another active transmitting radio frequency module in the daisy chain. This can achieve high isolation.

In some applications, a coupled power signal from the first actively transmitting radio frequency module 62 can propagate through the daisy chain at a different time than the coupled power signal form the second actively transmitting radio frequency module 64 in the radio frequency system 70. In such applications, a coupled power signal from the first actively transmitting radio frequency module 62 received by a feedback receiver does not propagate through the second actively transmitting radio frequency module 64.

Figure 8:
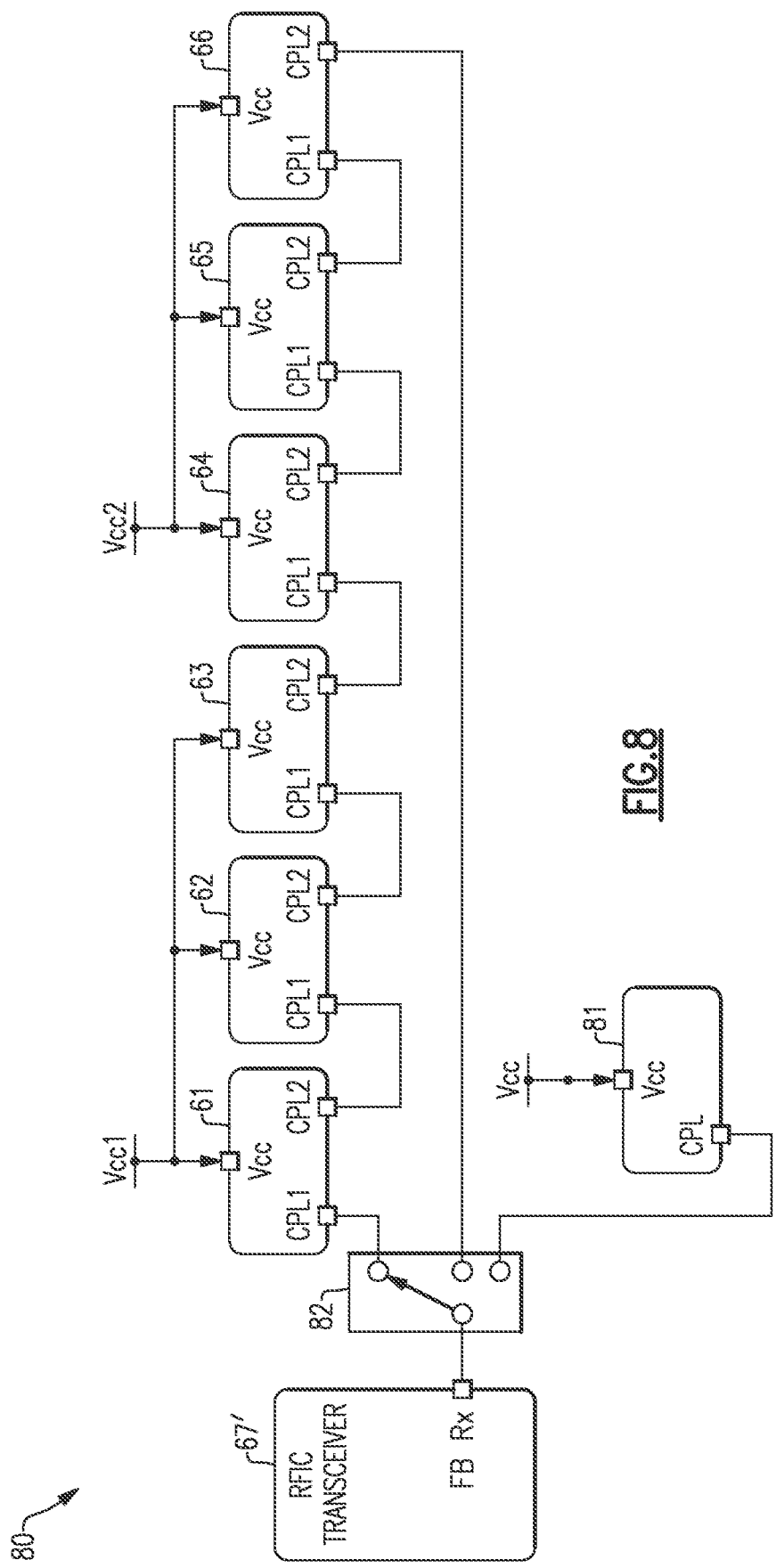
FIG. 8 is a schematic diagram of a radio frequency system with a bidirectional daisy chain of coupler switching circuits coupled to a single feedback receiver input via a switch according to an embodiment.

In certain applications, coupled power signals from the first actively transmitting radio frequency module 62 and the second actively transmitting radio frequency module 64 can propagate through the daisy chain concurrently in the radio frequency system 70. In such applications, the feedback receiver can separate the coupled power signals from the different actively transmitting radio frequency modules 62 and 64 for further separate processing. For example, a diplexer of the transceiver 67' can separate such coupled power signals FIG. 8 is a schematic diagram of a radio frequency system 80 with a bidirectional daisy chain of coupler switching circuits coupled to a single feedback receiver input via a switch 82 according to an embodiment. The switch 82 can selectively electrically connect one end of the daisy chain to the feedback receiver input port FB Rx of the transceiver 67'. The switch 82 can selectively electrically connect a port CPL of another radio frequency module 81 to the feedback receiver input port FB Rx.

The principles and advantages disclosed herein can be implemented in radio frequency systems where any suitable number of daisy chains of coupler switching circuits and any suitable number of ports of individual radio frequency modules can be electrically connected to a feedback receiver. For example, in certain applications, two or more daisy chains of coupler switching circuits can be electrically connected to a feedback receiver. As another example, in some applications, one or more daisy chains of coupler switching circuits and two or more individual radio frequency modules can be electrically connected to a feedback receiver. As one more example, in various applications, two or more daisy chains of coupler switching circuits can each be coupled to a different feedback receiver port and/or a different feedback receiver.

Figure 9:
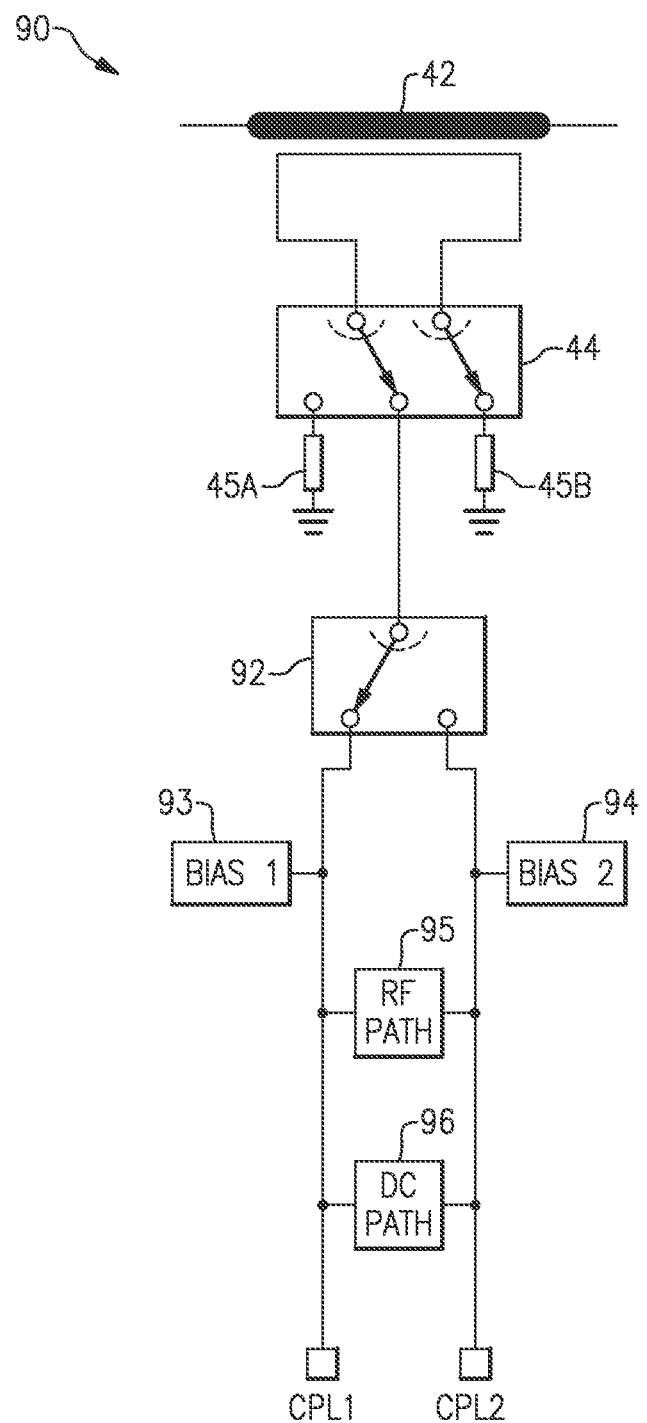
FIG. 9 is a schematic diagram of a portion of a radio frequency module with a bidirectional daisy chain coupler interface for coupled power signals with direct current and radio frequency components according to an embodiment.

FIG. 9 is a schematic diagram of a portion of a radio frequency module 90 with a bidirectional daisy chain coupler interface for coupled power signals with direct current and radio frequency components according to an embodiment. In the radio frequency system 90, a radio frequency coupler 42 can be electrically connected to either input/output port CPL1 or CPL2 via a termination and output switch 44 and a coupled power output switch 92. Biasing circuits 93 and 94 can each provide a direct current (DC) bias to a respective coupled power signal provided to input/output port CPL1 or CPL2 when the radio frequency coupler 42 is electrically connected to an input/output port CPL1 or CPL2. Accordingly, the coupled power signal provided to an input/output port CPL1 or CPL2 can have a DC component and an RF component. The radio frequency module 90 also includes an RF pass circuit 95 and a DC pass circuit 96 arranged to pass a coupled power signal between input/output ports CPL1 and CPL2. With the RF pass circuit 95 and the DC pass circuit 96, the radio frequency module 90 pass a coupled power signal between input/output ports CPL1 and CPL2 when the radio frequency module 90 is otherwise inactive. Accordingly, control of the daisy chain of coupler switching circuits can be simplified. Power of the radio frequency system can also be reduced. The RF pass circuit 95 and the DC pass circuit 96 can both be deactivated when the radio frequency coupler 42 is providing a coupled power signal to either of the input/output ports CPL1 and CPL2.

Figure 10:
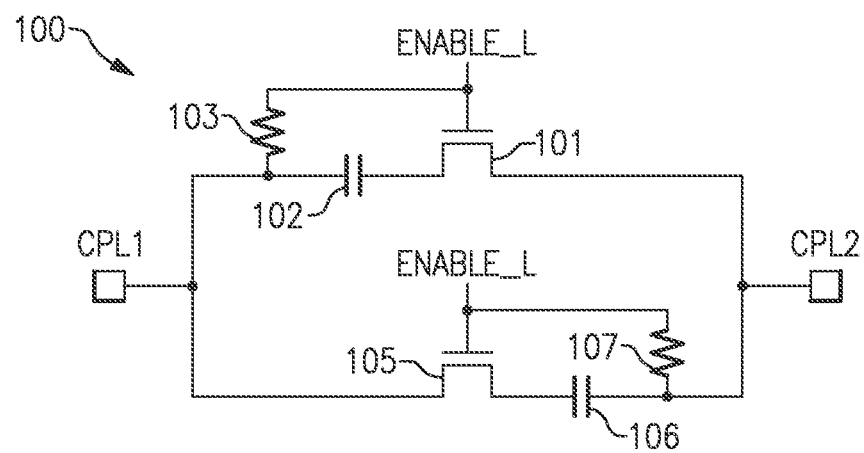
FIG. 10 is a schematic diagram of an example radio frequency pass circuit electrically connected between input/output ports of the radio frequency module of FIG. 9 according to an embodiment.

FIG. 10 is a schematic diagram of an example radio frequency pass circuit 100 that can be electrically connected between input/output ports of the radio frequency module 90 of FIG. 9 according to an embodiment. The radio frequency pass circuit 100 can implement the RF pass circuit 95 of FIG. 9.

A DC component of a coupled power signal received at the first input/output port CPL1 can be applied to a control terminal of a first pass transistor 101 via a biasing element 103 to turn on the first pass transistor 101. This can turn on the first pass transistor 101 when a radio frequency module that includes the radio frequency pass circuit 100 is otherwise inactive. A DC blocking element 102 can block the DC component of the coupled power signal received at the first input/output port CPL1 so that the pass transistor 101 passes the RF component of the coupled power signal to the second input/output port CPL2 when on.

A DC component of a coupled power signal received at the second input/output port CPL2 can be applied to a control terminal of a second pass transistor 105 via a biasing element 107 to turn on the first pass transistor 105. This can turn on the second pass transistor 105 when a radio frequency module that includes the radio frequency pass circuit 100 is otherwise inactive. A DC blocking element 106 can block the DC component of the coupled power signal received at the second input/output port CPL2 so that the pass transistor 105 passes the RF component of the coupled power signal to the first input/output port CPL1 when on.

When a radio frequency coupler is providing a coupled power signal to either of the input/output ports CPL1 or CPL2, the active low enable signal Enable_L can turn off the pass transistors 101 and 105 to deactivate the radio frequency pass circuit 100. This can decouple the input/output ports CPL1 and CPL2 from each other when one or more radio frequency couplers are providing a coupled power signal to at least one of these input/output ports.

Figure 11:
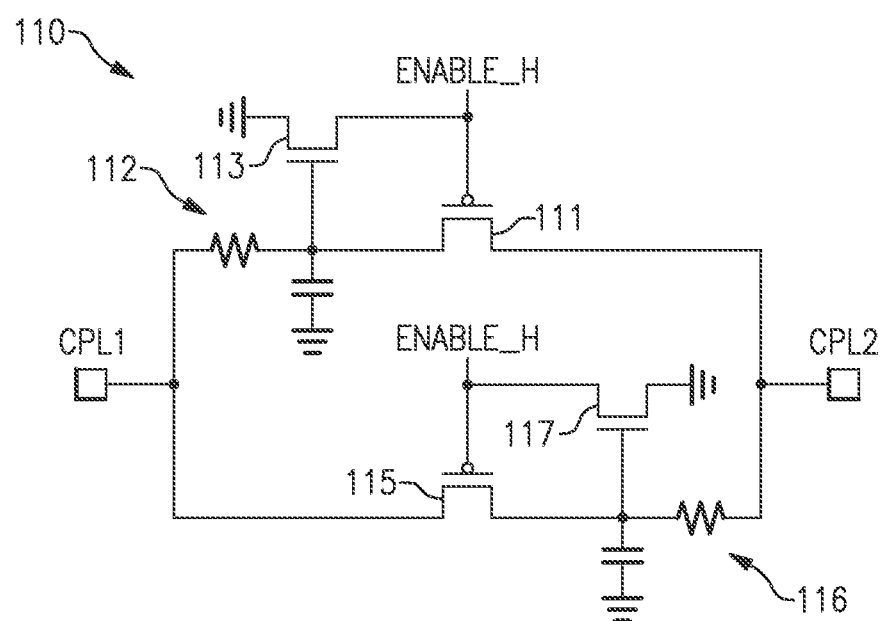
FIG. 11 is a schematic diagram of an example direct current pass circuit electrically connected between input/output ports of the radio frequency module of FIG. 9 according to an embodiment.

FIG. 11 is a schematic diagram of an example direct current pass circuit 110 that can be electrically connected between input/output ports of the radio frequency module of FIG. 9 according to an embodiment. The DC pass circuit 110 can implement the DC pass circuit 96 of FIG. 9.

A RF blocking element 112 can block an RF component of a coupled power signal received at the first input/output port CPL1. As illustrated, the RF blocking element 112 includes a resistor and a capacitor arranged as a low pass filter. The DC component of the coupled power signal received at the first input/output port CPL1 can turn on a transistor 113 that in turn turns on a first pass transistor 111. This can turn on the first pass transistor 111 when a radio frequency module that includes the direct current pass circuit 110 is otherwise inactive. The first pass transistor 111 can pass the DC component of the coupled power signal received at the first input/output port CPL1 to the second input/output port CPL2 when on.

A RF blocking element 116 can block an RF component of a coupled power signal received at the second input/output port CPL2. As illustrated, the RF blocking element 116 includes a resistor and a capacitor arranged as a low pass filter. The DC component of the coupled power signal received at the second input/output port CPL2 can turn on a transistor 117 that in turn turns on a second pass transistor 115. This can turn on the second pass transistor 115 when a radio frequency module that includes the direct current pass circuit 110 is otherwise inactive. The second pass transistor 115 can pass the DC component of the coupled power signal from the second input/output port CPL2 to the first input/output port CPL1 when on.

When a radio frequency coupler is providing a coupled power signal to either of the input/output ports CPL1 or CPL2, the active high enable signal Enable_H can turn off the pass transistors 111 and 115 to deactivate the DC pass circuit 110. This can decouple the input/output ports CPL1 and CPL2 from each other when one or more radio frequency couplers are providing a coupled power signal to at least one of these input/output ports.

Figure 12:
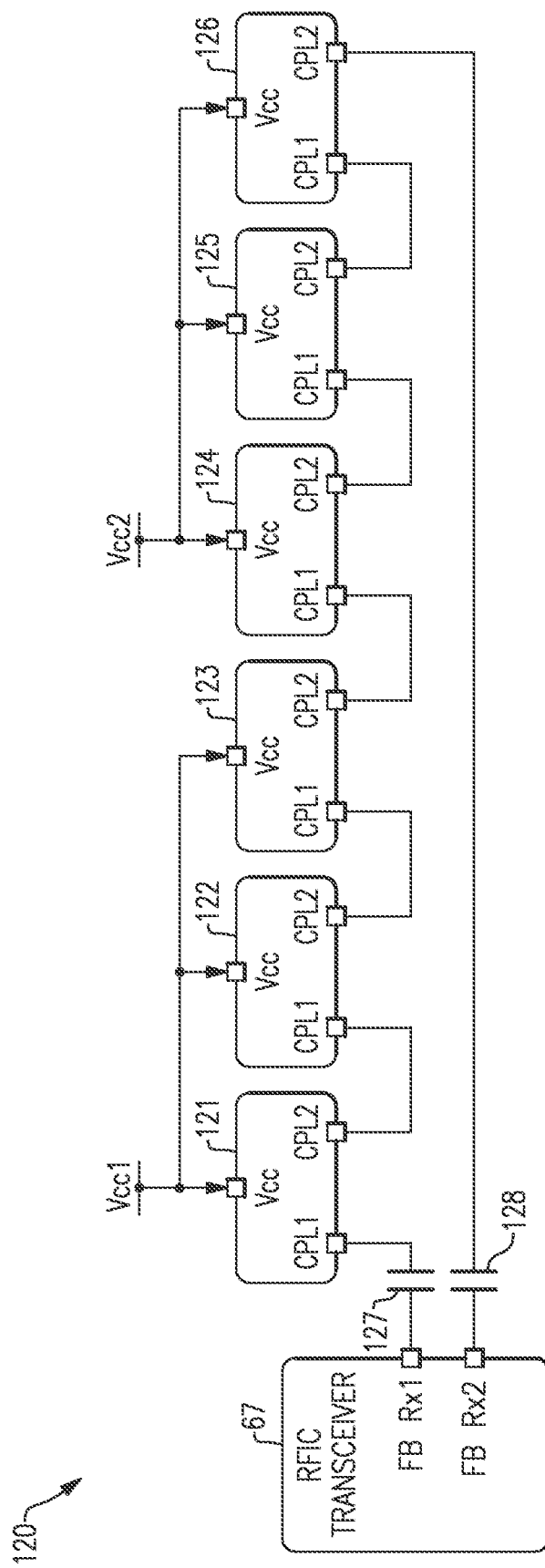
FIG. 12 is a schematic diagram of a radio frequency system with a bidirectional daisy chain of coupler switching circuits with direct current blocking elements between the daisy chain and dual feedback receiver inputs according to an embodiment.

FIG. 12 is a schematic diagram of a radio frequency system 120 with a bidirectional daisy chain of coupler switching circuits with direct current blocking elements 127 and 128 included between the daisy chain and dual feedback receiver inputs according to an embodiment. The radio frequency system 120 includes radio frequency modules 121, 122, 123, 124, 125, and 126 with respective coupler switching circuits arranged in a daisy chain. The coupler switching circuits can pass a coupled power signal having a DC component and a radio frequency component and to provide such a coupled power signal to an input/output port. The coupler switching circuits of the radio frequency modules 121 to 126 can be implemented in accordance with any suitable principles and advantages disclosed with reference to FIGS. 9 to 11. The radio frequency system 120 is like the radio frequency system 60 of FIG. 6A, except that (1) the coupler switching circuits of radio frequency modules 121 to 126 are configured to pass a coupled power signal with a DC component and an RF component and (2) the direct current blocking elements 127 and 128 can block the DC component of a coupled power signal from the daisy chain provided to feedback receiver ports FB Rx1 and RB Rx2, respectively, of a transceiver. As illustrated, direct current blocking elements 127 and 128 can be capacitors. Direct current blocking elements 127 and/or 128 can be implemented with a daisy chain of coupler switching circuits in accordance with any suitable principles and advantages disclosed herein.

Figure 13:
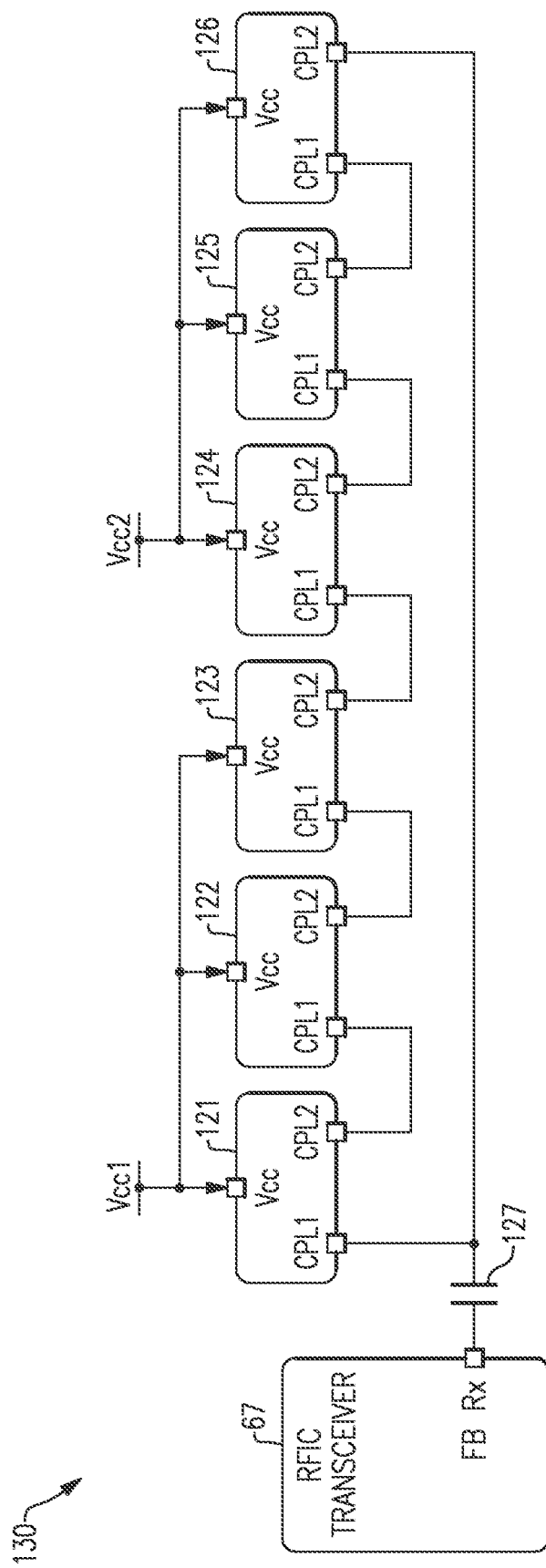
FIG. 13 is a schematic diagram of a radio frequency system with a bidirectional daisy chain of coupler switching circuits with a direct current blocking element between the daisy chain and a single feedback receiver input according to an embodiment.

FIG. 13 is a schematic diagram of a radio frequency system 130 with a bidirectional daisy chain of coupler switching circuits with a direct current blocking element 127 between the daisy chain and a single feedback receiver input according to an embodiment. The radio frequency system 130 is like the radio frequency system 70 of FIG. 7A, except that (1) the coupler switching circuits of radio frequency modules 121 to 126 are configured to pass a coupled power signal with a DC component and an RF component and (2) the direct current blocking element 127 can block the DC component of coupled power signal from the daisy chain provided to feedback receiver port FB Rx of the transceiver 67.

Radio frequency systems disclosed herein can perform methods of passing radio frequency power through a daisy chain of coupler switching circuits. Such methods can be performed in accordance with any suitable principles and advantages of the radio frequency modules and/or radio frequency systems disclosed herein. These methods can involve a coupled power signal propagating through circuitry of one or more radio frequency modules that are not actively transmitting while a plurality of radio frequency modules are actively transmitting. An example method can include providing two indications of radio frequency power to a daisy chain of coupler switching circuits while a plurality of radio frequency modules are concurrently transmitting. A first coupled power signal generated by a first actively transmitting radio frequency module can be provided to the daisy chain. A second coupled power signal generated by a second actively transmitting radio frequency module can also be provided to the daisy chain such that the first and second coupled power signals propagate in opposite direction in the daisy chain.

The first and second coupled power signals can be received by a feedback receiver. The coupled signals can be processed by the feedback receiver. Then one or more adjustments to a transmit path of an actively transmitting radio frequency module can be performed based on an output signal of the feedback receiver.

Wireless Communication Devices

The radio frequency modules and radio frequency systems disclosed herein can be included in wireless communication devices, such as mobile devices. An example of such a wireless communication device will be discussed with reference to FIG. 14.

Figure 14:
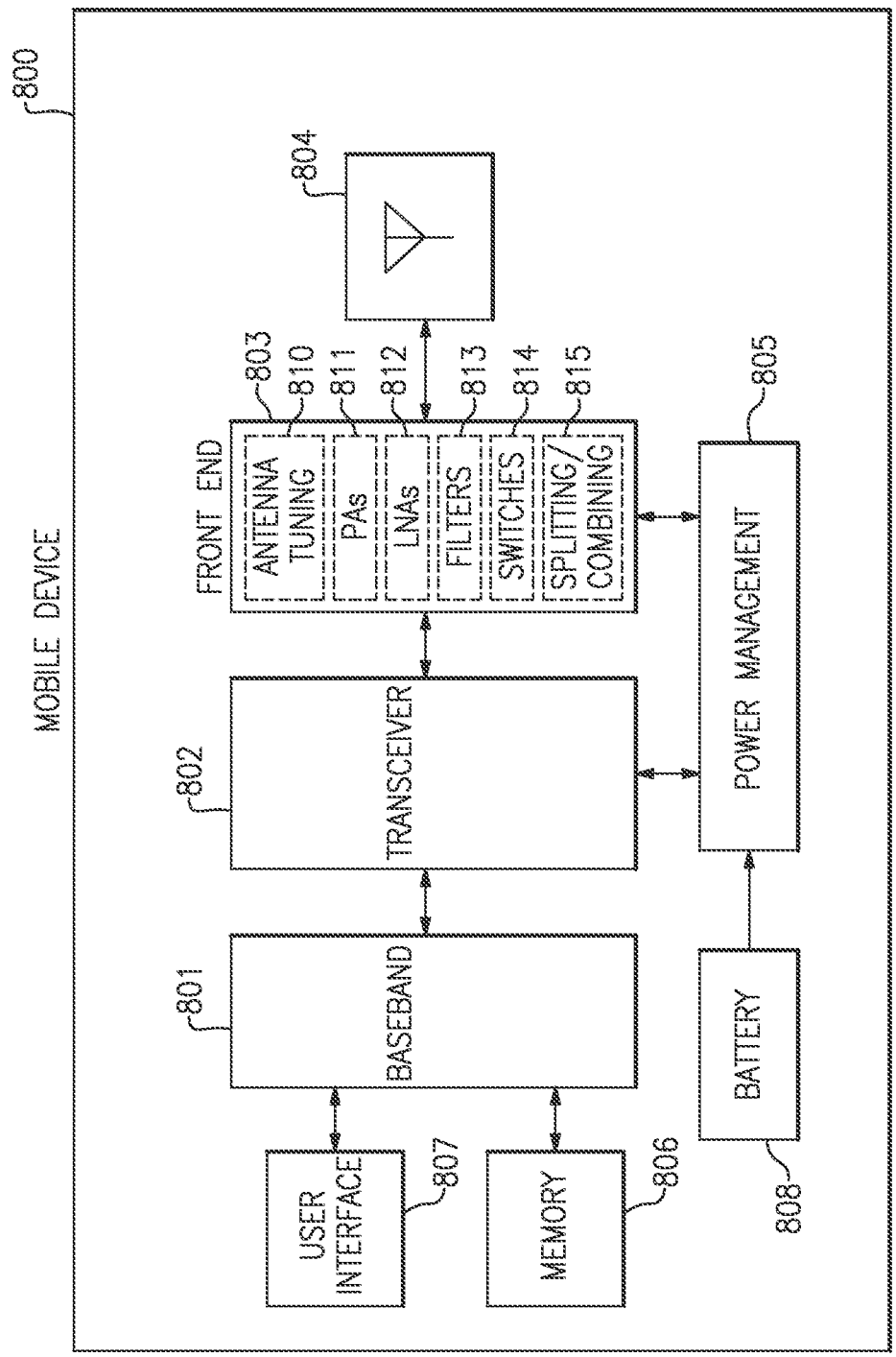
FIG. 14 is a schematic diagram of one embodiment of a mobile device.

FIG. 14 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 14 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible. The filters 813 can include one or more tunable filters with harmonic rejection with that include one or more features of the embodiments disclosed herein.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 14, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 14, the power management system 805 receives a battery voltage from the battery 808. The battery 808 can be any suitable battery for use in the mobile device 800, including, for example, a lithium-ion battery.

APPLICATIONS, TERMINOLOGY, AND CONCLUSION

Any of the embodiments described above can be implemented in association with mobile devices such as cellular handsets. The principles and advantages of the embodiments can be used for any systems or apparatus, such as any uplink wireless communication device, that could benefit from any of the embodiments described herein. The teachings herein are applicable to a variety of systems. Although this disclosure includes example embodiments, the teachings described herein can be applied to a variety of modules, systems, devices, and methods. Any of the principles and advantages discussed herein can be implemented in association with RF circuits configured to process signals having a frequency in a range from about 30 kHz to 300 GHz, such as in a frequency range from about 450 MHz to 8.5 GHz.

Aspects of this disclosure can be implemented in various electronic devices. Examples of the electronic devices can include, but are not limited to, consumer electronic products, parts of the consumer electronic products such as packaged radio frequency modules, radio frequency filter die, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a robot such as an industrial robot, an Internet of things device, a stereo system, a digital music player, a radio, a camera such as a digital camera, a portable memory chip, a home appliance such as a washer or a dryer, a peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure. Indeed, the novel filters, wireless communication devices, apparatus, methods, and systems described herein may be embodied in a variety of other forms. Furthermore, various omissions, substitutions and changes in the form of the filters, wireless communication devices, apparatus, methods, and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency module comprising:
   a first input/output port;
   a second input/output port;
   a radio frequency coupler; and
   a coupler switching circuit configured to pass an indication of radio frequency power received at the first input/output port to the second input/output port, pass an indication of radio frequency power received at the second input/output port to the first input/output port, and provide an indication of radio frequency power from the radio frequency coupler to the first input/output port.

2. The radio frequency module of claim 1 wherein the coupler switching circuit is configured to provide the indication of radio frequency power from the radio frequency coupler to the second input/output port.

3. The radio frequency module of claim 1 wherein the indication of radio frequency power is an indication of forward radio frequency power, and the coupler switching circuit is configured to provide an indication of reflected radio frequency power from the radio frequency coupler to the first input/output port.

4. The radio frequency module of claim 3 wherein the coupler switching circuit is configured to provide the indication of radio frequency power to the second input/output port and to provide the indication of reflected radio frequency power to the second input/output port.

5. The radio frequency module of claim 1 further comprising a power amplifier having an output electrically coupled to the radio frequency coupler.

6. The radio frequency module of claim 5 further comprising one or more circuit elements in a signal path between the output of the power amplifier and the radio frequency coupler.

7. The radio frequency module of claim 6 wherein the one or more circuit elements include a switch.

8. The radio frequency module of claim 1 further comprising a second radio frequency coupler, the coupler switching circuit configured to provide an indication of radio frequency power from second radio frequency coupler to the first input/output port.

9. The radio frequency module of claim 1 wherein the coupler switching circuit includes a plurality of switches arranged to pass the indication of radio frequency power received at the first input/output port to the second input/output port, pass the indication of radio frequency power received at the second input/output port to the first input/output port, and provide the indication of radio frequency power from the radio frequency coupler to the first input/output port.

10. The radio frequency module of claim 9 wherein the plurality of switches includes a switch configured to selectively electrically connect a termination impedance to a port of the radio frequency coupler.

11. A radio frequency system comprising:
a first radio frequency module including a first port and a first coupler switching circuit;
a second radio frequency module including a second coupler switching circuit; and
a third radio frequency module including a first input/output port, a second input/output port, a radio frequency coupler, and a third coupler switching circuit, the third coupler switching circuit being included in a daisy chain that also includes the first and second coupler switching circuits, the third coupler switching circuit configured to pass an indication of radio frequency power received at the first input/output port to the second input/output port, pass an indication of radio frequency power received at the second input/output port to the first input/output port, and provide an indication of radio frequency power from the radio frequency coupler to the first input/output port.

12. The radio frequency system of claim 11 wherein the third coupler switching circuit is configured to provide the indication of radio frequency power from the radio frequency coupler to the second input/output port.

13. The radio frequency system of claim 11 wherein the indication of radio frequency power is an indication of forward radio frequency power, and the third coupler switching circuit is configured to provide an indication of reflected radio frequency power from the radio frequency coupler to the first input/output port.

14. The radio frequency system of claim 11 wherein the third radio frequency module further includes a second radio frequency coupler, and the third coupler switching circuit is configured to provide an indication of radio frequency power from second radio frequency coupler to the first input/output port.

15. The radio frequency system of claim 11 wherein the first radio frequency module and the second radio frequency module are configured to transmit concurrently.

16. The radio frequency system of claim 15 wherein the radio frequency system is configured to concurrently pass a first indication of radio frequency power from the first radio frequency module and a second indication of radio frequency power from the second radio frequency module in different directions in the daisy chain.

17. The radio frequency system of claim 11 further comprising a feedback receiver having an input port electrically coupled to the daisy chain.

18. A wireless communication device comprising:
a radio frequency module including a first input/output port; a second input/output port; a radio frequency coupler; and a coupler switching circuit configured to pass an indication of radio frequency power received at the first input/output port to the second input/output port, pass an indication of radio frequency power received at the second input/output port to the first input/output port, and provide an indication of radio frequency power from the radio frequency coupler to the first input/output port; and
an antenna in communication with the radio frequency module and configured to transmit a radio frequency signal generated by the radio frequency module.

19. The wireless communication device of claim 18 further comprising two additional radio frequency modules each including a respective coupler switching circuit that is included in a daisy chain with the coupler switching circuit of the radio frequency module.

20. The wireless communication device of claim 19 wherein the wireless communication device is configured to concurrently pass two indications of radio frequency power in opposing directions in the daisy chain.

* * * * *